Patented Jan. 2, 1951

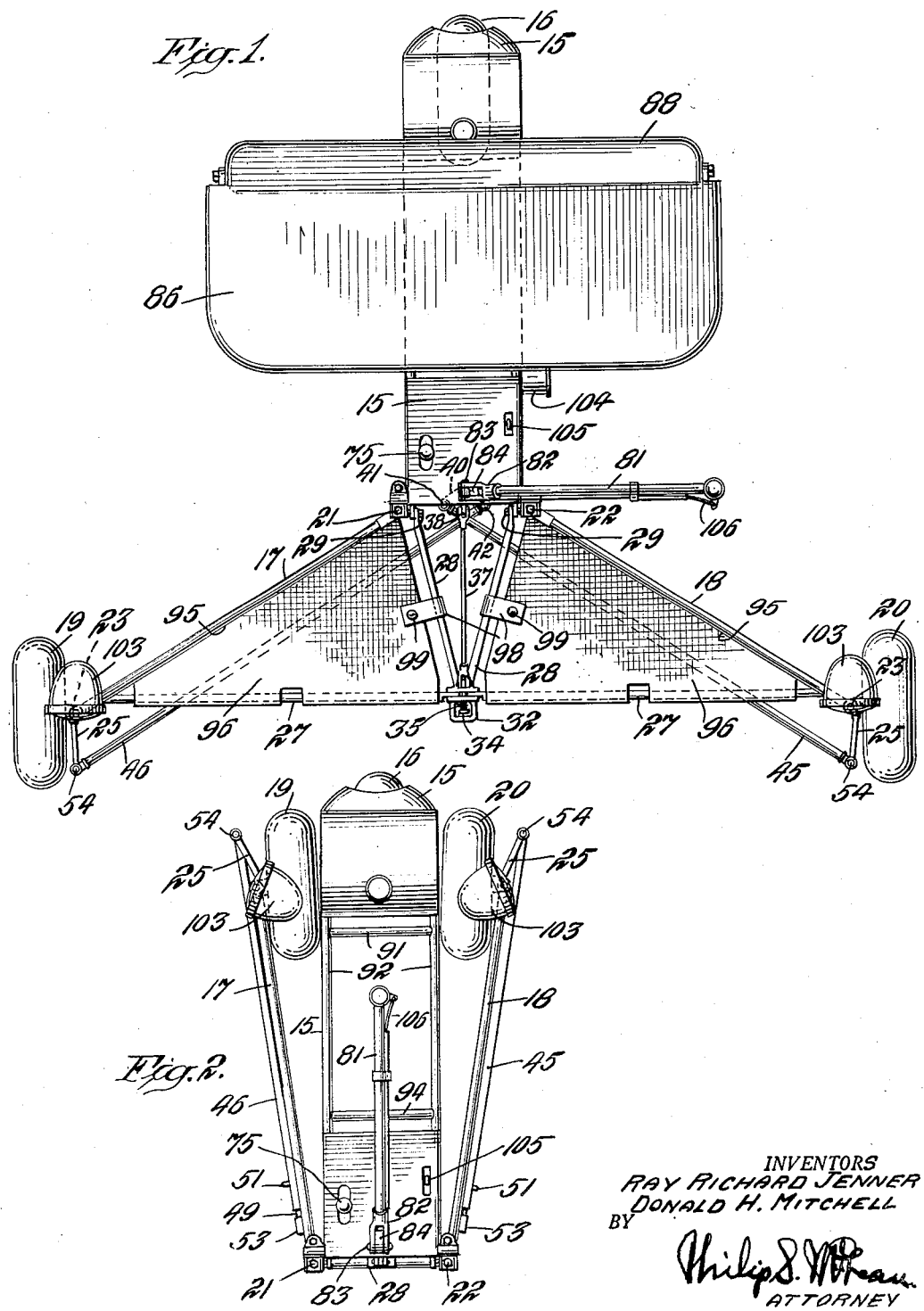

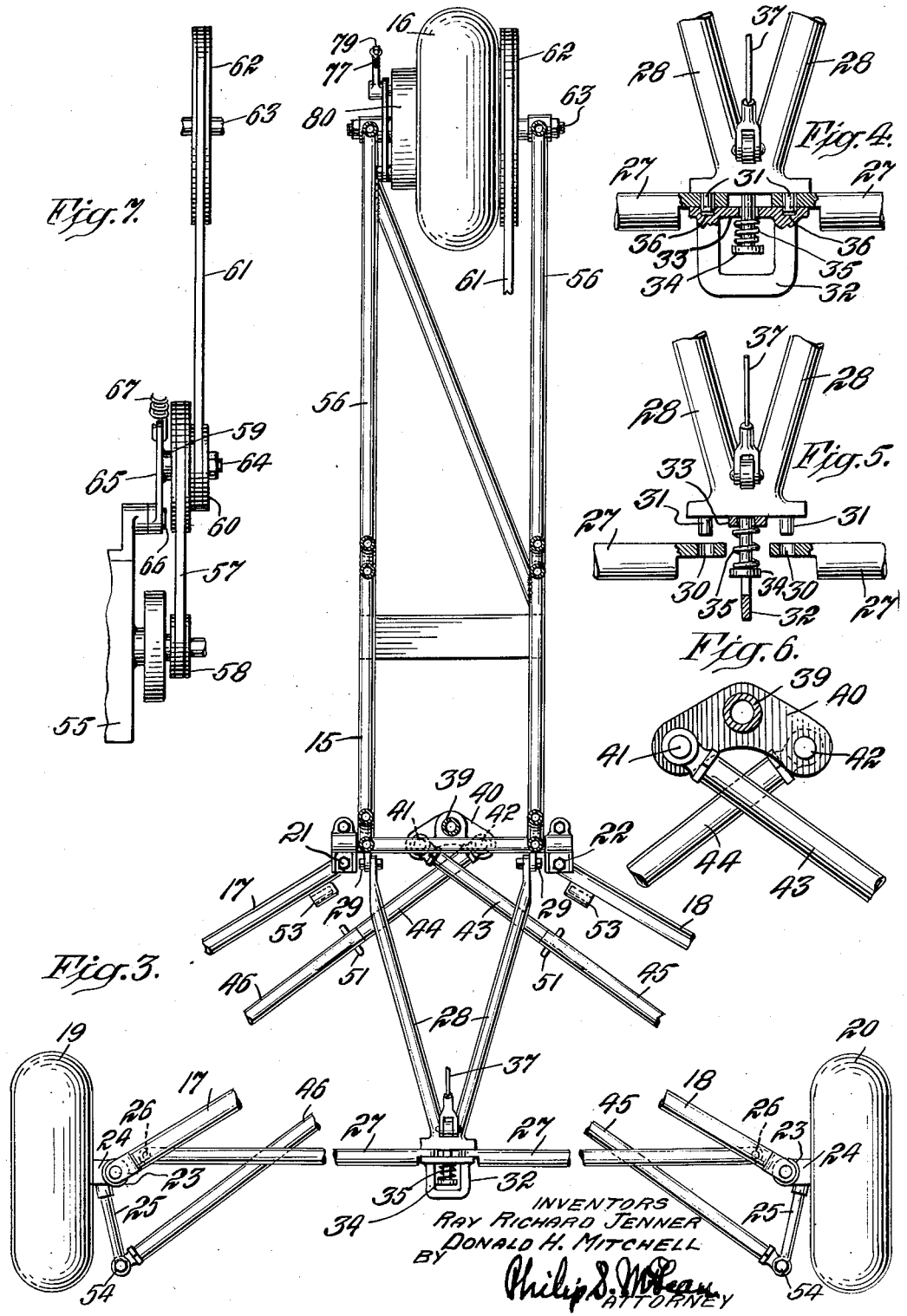

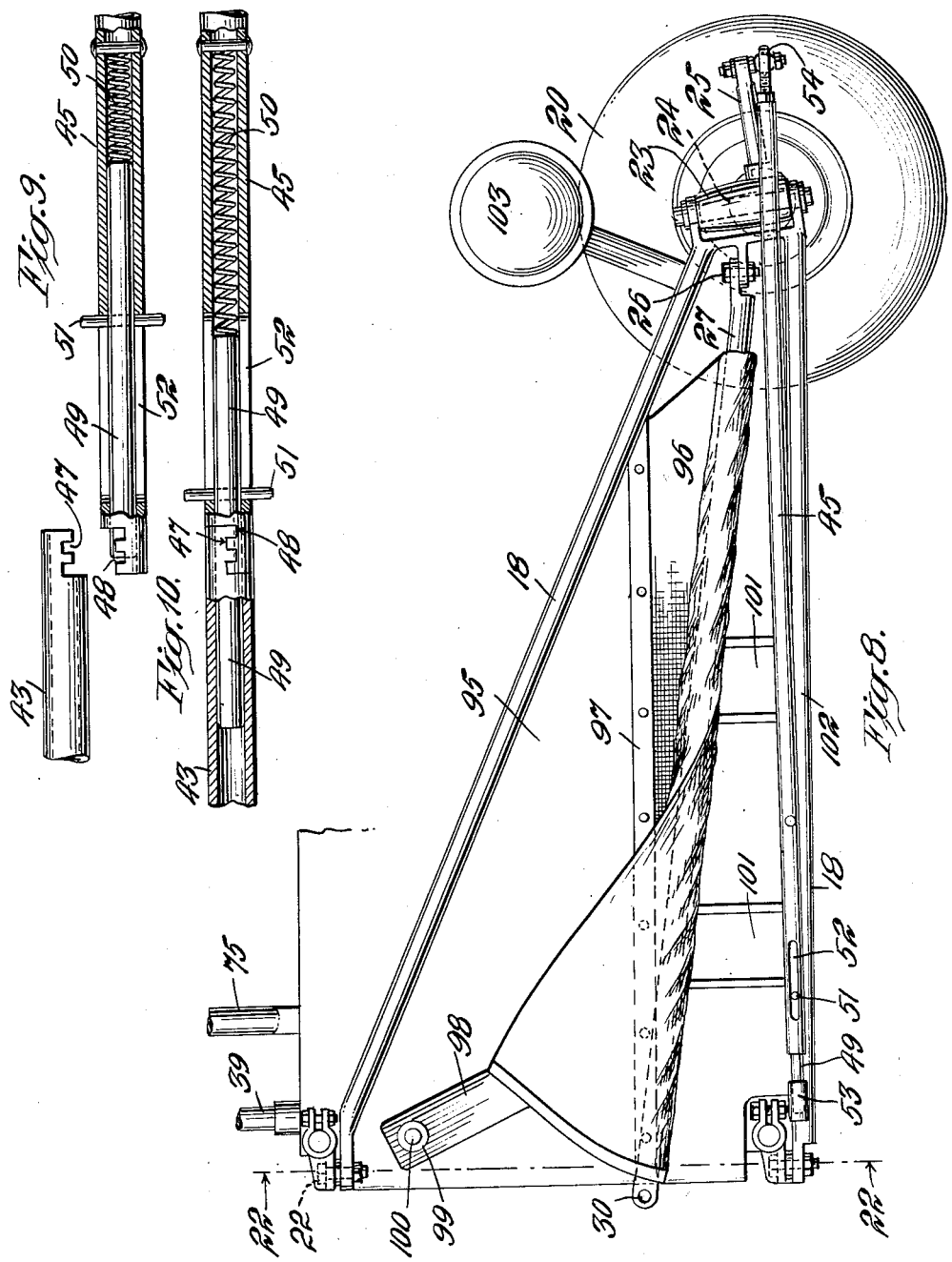

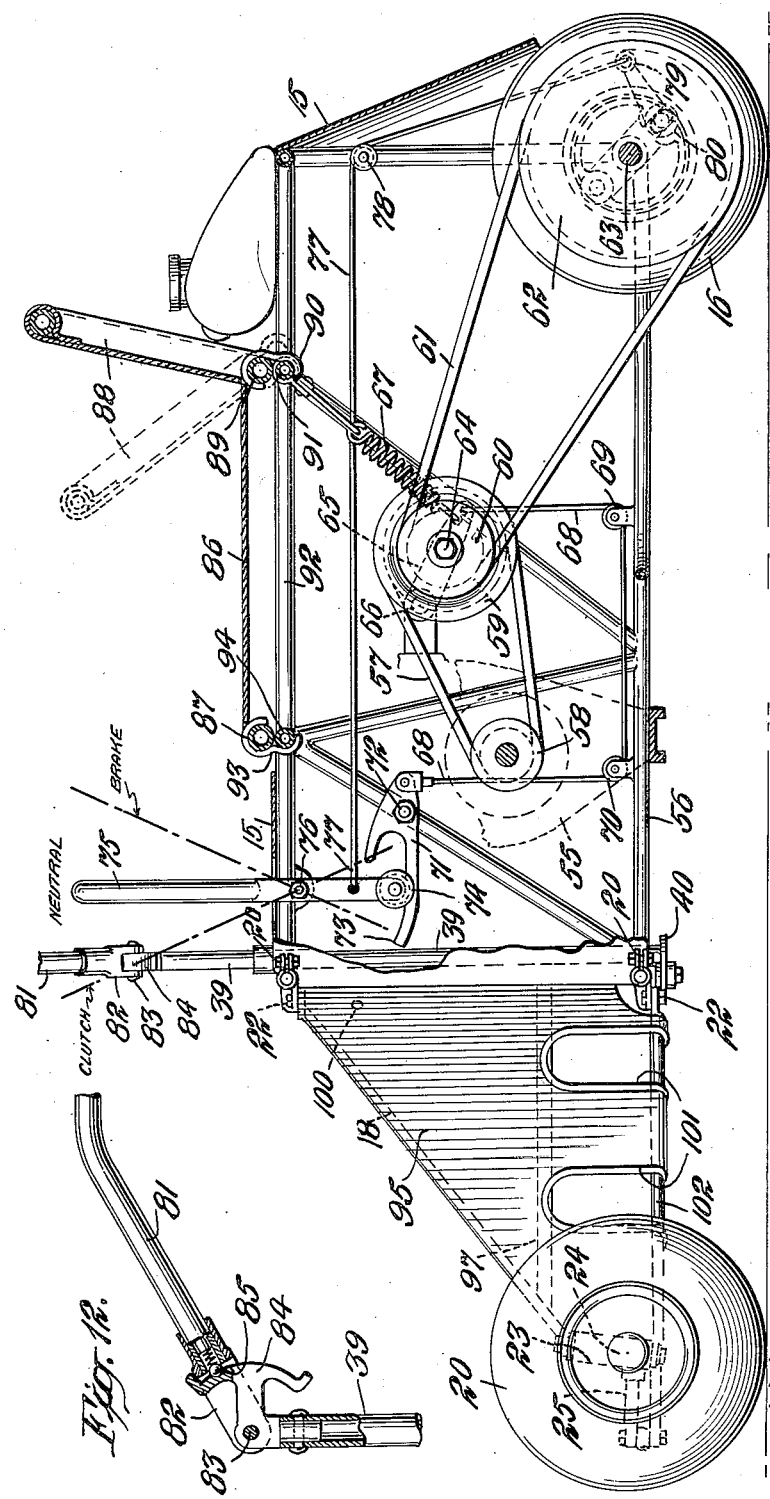

2,536,749

UNITED STATES PATENT OFFICE 2,536,749

FOLDING MOTOR VEHICLE FOR AIRCRAFT

Ray Richard Jenner, Wichita, Kans., and Donald H. Mitchell, Chicago, Ill.

Application September 26, 1947, Serial No. 776,196

19 Claims. (Cl. 180—25)

The invention herein disclosed relates to motor vehicles of a folding type.

Objects of the invention are to provide a light weight motor vehicle capable of carrying one or more passengers and baggage and which will be foldable into small space so that it may be carried in the baggage compartment of a small or medium size airplane.

Particular objects of the invention are to provide a motor vehicle of this character which can be stowed away in a relatively small space in an airplane and which when needed can be easily taken out and quickly set up and used, for example, to transport a pilot and passenger, with accompanying baggage, from an outlying airport to a town or business center; also, of such character that it may be quickly folded up and put away in the airplane ready to be used at a subsequent landing.

Further special objects of the invention are to provide a motor transport of the character indicated which while particularly light and foldable into small space, will be strong and durable and fully capable of carrying passengers and baggage, at reasonable speed, over ordinary roads such as usually present between city centers and outlying air fields.

Other special objects of the invention are to provide a motor carrier such as indicated, which can be produced and operated at low cost and which will meet existing requirements as to controls, lighting, identification and the like.

Other desirable objects and the novel features through which all purposes of the invention are attained are set forth or will appear in the course of the following specification.

The drawings accompanying and forming part of the specification illustrate a present practical commercial embodiment of the invention. Structure, however, may be modified and changed as regards the immediate illustration, all within the true intent and broad scope of the invention as hereinafter defined and claimed.

Fig. 1 in the drawing is a top plan view of the machine as set up for use;

Fig. 2 is a plan view showing the same folded for storage in the baggage compartment of an airplane;

Fig. 3 is a broken and part sectional plan view of the main frame portions of the machine, on a larger scale;

Figs. 4 and 5 are further enlarged broken and part sectional views showing the front wheel spreader bars and coupler, first in coupled and then in the disconnected, ready to be coupled relation;

Fig. 6 is a broken part sectional view of the steering segment and inner portions of the reach rods which are connected with the steering knuckles;

Fig. 7 is a fragmentary plan view of the belt transmission connections from the motor to the rear wheel;

Fig. 8 is a broken side elevation showing one of the wheel trusses folded back against the side of the body or main frame;

Figs. 9 and 10 are broken sectional details of one of the couplings for the steering or reach rods;

Fig. 11 is a side elevation of the machine set up for use with portions of the body structure broken away and appearing in section;

Fig. 12 is a broken sectional detail of the hinged steering handle at the top of the steering column.

As shown in Figs. 1 and 2, the vehicle comprises a narrow, box-like body 15 providing a mounting for the motor, transmission and rear driving wheel 16, short enough to be stowed transversely in the baggage compartment of what may be considered an average size personal airplane and having trusses 17, 18, carrying the front wheels 19, 20, and hinged at the front corner portions of the body at 21, 22, so as to fold back closely against the sides of the body.

The foldable side portions 17, 18, as shown in Fig. 8, are of substantially triangular formation, mounting the pivoted steering knuckles 23 at their outer ends, the latter carrying the spindles or axles 24 for the wheels and provided with steering arms 25.

Pivotally connected with the outer ends of the truss frames 17, 18, at 26, are spreader rods 27 which can be connected together at the center to hold the front wheels in rigidly spaced relation.

The means for coupling the spreader rods 27 is shown in Figs. 3, 4 and 5 as a triangular folding truss 28 pivoted horizontally to the lower forward corners of the body at 29 so as to drop down from an upwardly folded position at the front of the body, as shown in Fig. 2, into the forwardly projecting relation shown in Fig. 3, in line with the adjoining inner ends of the spreader rods.

These rods are shown as having perforated lugs 30 at their inner ends to engage over forwardly projecting pins 31 at the apex of the coupling truss 28, where they are removably secured by a turn handle 32 pivoted at 33 on the stud 34, carried by the truss and forced by spring 35 into engagement over the ends of the rods, as in Fig. 4. The overlying end portions of the turn handle are shown as recessed at 36 to seat over the ends of the pins 31, thus to be held by the spring in interlocked engagement over the coupled rod ends.

The coupling truss 28 is supported at a fixed level in its lowered position by a short length of flexible cable 37 connected with the top portion of the frame at 38, Fig. 1.

Steering is accomplished by an upright steering column 39 journaled in the forward portion of the body and carrying at its lower end a double arm lever or segment 40, Fig. 6, carrying studs 41, 42, on which are pivotally engaged the crossed inner sections 43, 44, of the steering rods or links.

The outer sections of these steering rods or links are designated 45, 46, Fig. 3, and the two sections of each rod are disconnectably coupled as by the means illustrated in Figs. 9 and 10 and comprising interlocking, companion, transverse jaw elements 47, 48, on the meeting ends of the sections held interlocked in the longitudinally aligned relation of the sections by a sliding plunger 49 in one section, extended by a spring 50 in that section to the extent permitted by the transverse pin or key 51 on the plunger operating in a transverse slot 52 in the tubular rod section.

Using the transverse pins 51 as handles, the spring plungers 49 can be withdrawn as in Fig. 9, to immediately release and permit uncoupling of the joined sections of the steering rods. With the spring plungers withdrawn as in Fig. 9, the toothed half sections 47, 48 at the ends of the rods may be brought into aligned, meshed relation and the plungers released to lock them in this condition, as indicated in Fig. 10.

When the tubular links described are uncoupled as in Fig. 9, the longer lengths 45, 46, will remain connected with the steering arms 25 and be carried back by the side frames 17, 18, as the latter are folded back against the sides of the body frame, as particularly shown in Fig. 2.

To hold them in this relation and to keep them supported while the sides are being folded back, sockets 53 are provided on the lower arms of the truss frames 17 and 18, in position to receive the ends of the spring plungers 49.

Thus when the rod sections are uncoupled they may be immediately secured in supported relation at the sides of the wheel frames 17, 18, by swinging such sections 45, 46, inward against the lower arms of such frames and engaging the spring plungers 49 in the socket 53, Figs. 2 and 8.

When the steering links are uncoupled and the longer sections folded back against the sides of the frame, the shorter sections 43, 44, remain connected with the lever system 40 at the lower end of the steering column where they can be turned inward on their pivot studs 41, 42, beneath the body structure.

To allow for the crossed relation, using straight links, one link 43, 45, is taken off the top of the steering lever segment 40, Fig. 6, and the other link 44, 46, off the bottom of that lever. At their outer ends these links are shown as pivotally connected with the steering arms 25 by universal joints 54, which allow for all necessary adjustments of the links and facilitate the coupling and uncoupling operations.

The motor is indicated at 55, Fig. 11, as a small internal combustion engine mounted on the framework 56 and housed within the covering or sheathing of the body 15.

The transmission is shown as a belt drive connection 57 from the motor pulley 58 to an intermediate pulley 59 carrying a second pulley 60 connected by belt 61 with a final drive pulley 62 on the rear wheel 16. The latter is indicated as journaled on an axle 63 supported across the rearward lower corner portion of the main frame.

For control purposes the intermediate pulleys 59, 60, are journaled on a stud 64 carried by a lever 65 pivoted on a horizontal axis 66 at one end and drawn upward at the opposite end to effect tightening of the belts by a spring 67, Fig. 11.

To swing the pulley carrying lever 65 downward to loosen the belts, there is provided a cable 68 connected with the free end of the lever and extending over guide pulleys 69, 70, to one end of the cam lever 71 pivoted on the frame at 72 and having a cam portion 73 toward its opposite end engaged by cam roller 74 on the lower end of a control lever 75 pivoted at 76.

As shown in Fig. 11, the control lever 75 in an upright, neutral position, depresses the forward end of the rocker lever 71 sufficiently for the cable 68 to hold the pulley carrying lever 65 down against the tension of spring 67 enough to release the belts 57 and 61 to prevent forward drive.

By pushing control lever 75 forward the rocker or cam lever 71 will be permitted to rock under pull of the spring 67 sufficiently for the belts to tighten on the pulleys 59, 60, thus to effect a forward drive or clutched relation from the engine to the rear drive wheel.

To enable lever 75 to be used for braking as well as for forward drive control, there is provided in the present illustration a brake operating cable 77 connected with the lower portion of said lever above the roller 74 and extending rearwardly over a guide roller 78 and downward to the arm 79 for operating the brake 80, Figs. 3 and 11.

The cam 73 of lever 71 is given an upward rise so that, as shown in Fig. 11, said lever will be depressed or held in a lowered clutch releasing position as the control lever 75 is rocked backward to apply the brake.

The steering column 39 is shown as operated by a hand lever 81 having a shackle 82 pivoted on top of the column at 83 and adjustable up and down over a motion limiting segment 84, Fig. 12. A spring ball detent is indicated at 85 for releasably retaining the steering handle in either its raised position for use or in a lowered, folded position.

A transversely extending seat 86 is shown removably mounted on top of the body, made up of a tubular frame 87 covered with canvas or the like and suited for carrying two passengers, one at each side of the body.

The seat frame 87 is shown as having a backrest frame 88 pivoted thereon at 89, Fig. 11, and this pivoted backrest frame is shown as carrying hooks 90 projecting from the lower edge to enter between the sides of the main frame and hook under a cross brace 91 connecting the top side bars 92 of the frame.

At the front edge the seat frame 87 is shown as having dependent, rigid hooks 93 to enter between the side rails 92 and catch beneath the cross brace 94.

In Fig. 11 it will be seen that upon rocking the back brace 88 forwardly as in dotted lines, the swinging hooks 90 will be released from the cross bar 91 and the whole seat can then be shifted forwardly sufficiently to disengage the forward hooks 93 from the cross brace 94. Thus the seat can be quickly removed from the frame and it will be evident that it can be as quickly mounted and secured on the frame by first locating it with the forward hooks 93 caught beneath the cross bar 94 and then rocking the backrest 88 from a lowered position upwardly, as in the full lines, Fig. 11, to catch the swinging hooks 90 beneath the cross brace 91. In use the backrest 88 will be held in the upright, locked position by the passenger or passengers sitting on the seat, guarding against accidental release of the seat while the machine is in use.

As shown in Fig. 2, the top of the body frame may be left uncovered to expose the side rails 92 and the cross bars 91, 94, so that the seat may be quickly fitted in place or be removed.

When the machine is folded up as in this view, the seat with the backrest folded down flat, constitutes a separate but relatively small, flat object which can be stored alongside of and as a related part of the folded machine, particularly since it may be of approximately the same proportions as the side dimensions of the body.

For carrying baggage, the side swinging wheel frames 17, 18, are shown as having vertical walls 95 of heavy fabric or the like and similar, forwardly extending flooring panels 96. For folding purposes the latter are shown as secured horizontally at the rear, at 97, Fig. 8, to the upright panels 95 and as looped or secured at their forward edges about the spreader rods 27, Fig. 1.

At the center the bottom or flooring panels 96 are shown caught over the side bars of the forwardly extending triangular coupling truss 28 by straps 98 removably secured as by snap fasteners 99. This prevents objectionable sagging under the weight of baggage or other objects placed on these panels.

When the machine is to be folded, the panel securing straps 98 may be unsnapped at 99 and then, as shown in Fig. 8, when the side frames are folded back, the spreader rods 27 to which the panels 96 are secured, may be supported by carrying the intermediate, strap loop portions of these panels downward and then upward about the rods 27 and snapping the fasteners 99 over special snap fastener elements 100 provided for that purpose on the side panels 95, Figs. 8 and 11.

Footrests for the passengers are provided in the illustration by an opening or openings 101 in the back panels 95, exposing the lower rails 102 of the side frames 17, 18.

The side frames 17, 18, are shown as carrying lamps 103 which will face forwardly in the driving position, Fig. 1, and horn, license brackets and other accessories may all be mounted on the body of the machine, as desired or required.

In the folded condition of the machine the side frames may be secured together across the back of the machine by a temporary connecting strap or the like. In this condition the machine constitutes a single, compact package which will rest solidly on the three wheels in their closely adjoined relation. As shown in Fig. 2, the wheels at the sides will not be as far back as the rear drive wheel and the projecting relation of this wheel enables the folded machine to be trundled along by lifting the front end of the structure, and this may be done by grasping the upwardly folded coupling truss 28 at that end and using it as a handle for pushing or pulling the folded object.

The main frame and other parts may be made of light, welded, aluminum tubing so that while amply strong, the structure will be relatively light in weight. The folding into a substantially rectangular shaped package facilitates handling and enables the machine to be stowed in baggage compartments of the size usually provided in personal planes. The machine is of such size that it may be handled by one person and hence be used by a lone pilot. On arrival at an airport the machine may be lifted out in the folded package form and be quickly set up by swinging the side frames 17, 18, forwardly from the position shown in Fig. 2, to the position shown in Fig. 1, unsnapping the straps 98 from the supported position shown in Fig. 8 and connecting the spreader bars 27 together by the center coupling frame or truss 28, the latter being accomplished as shown in Fig. 5, by engaging the ends of the rods 27 over the pins 31 and turning the spring clamp 32 as in Fig. 4, to secure them in that relation. The straps 98 of the bottom panels 96 may then be looped about the sides of the truss 28 and snapped in that relation. The outer steering rod sections 45, 46, after being uncoupled from the holding sockets 53 by withdrawing the slide bolts 49, Fig. 8, may then be joined to their shorter mating sections 43, 44, as indicated in Figs. 9 and 10, using the slide bolts 49 in this case to lock the joined sections rigidly together.

The seat 86 is mounted by simply placing it across the top of the frame and interlocking the fixed and the swinging hooks 93, 90, with the top cross bars 94, 91.

The engine may be equipped with an exposed cord pulley 104, Fig. 1, for starting the same, or starting may be accomplished by simply pushing the vehicle with the lever 75 in a forward, clutch engaged position.

Various controls such as an ignition switch or exhaust valve lifter 105 and throttle control 106 may be provided for the motor, as indicated in Fig. 1, with a view to furnishing a motor carrier for aircraft passengers and baggage, completely satisfactory as to roadability and other characteristics.

While particularly important as providing a practical means of land transportation for airplane pilots and passengers, it is realized that the motor vehicle herein disclosed, because of its ready and compact foldability, has many other uses, for example on boats, railway trains, automobiles and the like.

The panels forming the baggage carrier, that is, upright panel 95 and horizontally extending panel 96, may be all in one piece, for example one continuous piece of heavy canvas, which will readily fold into small space and the folding may be accomplished by simply doubling the intermediate portion of the lower panel 96 upwardly between tie rod 27 and vertical panel 95 instead of looping it under and about the tie rod, as illustrated in Fig. 8.

What is claimed is:

1. A folding motor vehicle for aircraft comprising a body structure, side frames hinged to the forward end of said body structure and carrying steerable road wheels, a drive wheel at the rearward end of the body structure, a motor in the body structure, controllable transmission drive from said motor to said drive wheel, spreader rods connected with the outward ends of said side frames and an upwardly folding center truss pivoted to the lower front portion of the body structure and arranged to be swung downward into position for connecting the inner ends of said spreader rods.

2. A folding motor vehicle for aircraft comprising a body structure, side frames hinged to the forward end of said body structure and carrying steerable road wheels, a drive wheel at the rearward end of the body structure, a motor in the body structure, controllable transmission drive from said motor to said rear drive wheel, spreader rods connected with the outward ends of said side frames and an upwardly folding center truss pivoted to the lower front portion of the body structure and arranged to be swung downward into position for connecting the inner ends of said spreader rods, a steering column journaled in said body structure and links in separably connectable sections extending from said steering column to said steerable wheels.

3. A folding motor vehicle for aircraft comprising a body structure, side frames hinged to the forward end of said body structure and carrying steerable road wheels, a drive wheel at the rearward end of the body structure, a motor in the body structure, controllable transmission drive from said motor to said rear drive wheel, spreader rods connected with the outward ends of said side frames, an upwardly folding center truss pivoted to the lower front portion of the body structure and arranged to be swung downward into position for connecting the inner ends of said spreader rods and a quick releasable coupling carried by said downwardly lowering truss for locking the ends of the spreader rods together in connected relation.

4. A folding motor vehicle for aircraft comprising a body structure, side frames hinged to the forward end of said body structure and carrying steerable road wheels, a drive wheel at the rearward end of the body structure, a motor in the body structure, controllable transmission drive from said motor to said rear drive wheel, spreader rods connected with the outward ends of said side frames and an upwardly folding center truss pivoted to the lower front portion of the body structure and arranged to be swung downward into position for connecting the inner ends of said spreader rods, a steering column journaled in said body structure, links in separably connectable sections extending from said steering column to said steerable wheels, quick releasable couplings for effecting the connection of said spreader rods to said center truss and quick releasable couplings for connecting the sections of said steering links.

5. A folding motor vehicle for carrying on aircraft comprising a generally rectangular body frame, side frames hinged to forward end portions of said body frame and arranged to swing rearwardly at the opposite sides of said body frame, road wheels on said side frames and the rearward end of said body frame, means for securing said side frames in forwardly positioned relation, means on said body frame for effecting steering of the wheels on said side frames and disconnectable to enable folding of said side frames toward the sides of said body frame, a motor in said body frame connected to drive said rear wheel and a cross seat detachably mounted on top of said body frame in back of said hingedly mounted side frames.

6. A folding motor vehicle for carrying on aircraft comprising a generally rectangular body frame, side frames hinged to forward end portions of said body frame and arranged to swing rearwardly at the opposite sides of said body frame, road wheels on said side frames and the rearward end of said body frame, means for securing said side frames in forwardly positioned relation, means on said body frame for effecting steering of the wheels on said side frames and disconnectable to enable folding of said side frames toward the sides of said body frame, a motor in said body frame connected to drive said rear wheel, a cross seat detachably mounted on top of said body frame in back of said hingedly mounted side frames and baggage supporting means carried jointly by said side frames and said means for connecting the same.

7. A folding motor vehicle for carrying on aircraft comprising a generally rectangular body frame, side frames hinged to forward end portions of said body frame and arranged to swing rearwardly at the opposite sides of said body frame, road wheels on said side frames and the rearward end of said body frame, means for securing said side frames in forwardly positioned relation, means on said body frame for effecting steering of the wheels on said side frames and disconnectable to enable folding of said side frames toward the sides of said body frame, a motor in said body frame connected to drive said rear wheel, a cross seat detachably mounted on top of said body frame in back of said hingedly mounted side frames and baggage supporting means carried jointly by said side frames and said means for connecting the same, including a forwardly projecting truss hingedly connected with the lower, forward portion of said body frame and supporting panels connected between said side frames, the means for connecting the same and said forwardly projecting hinged truss.

8. A folding motor vehicle for carrying on aircraft comprising a body frame of narrow, upright, generally rectangular structure, a drive wheel journaled at the rear of said body frame, substantially triangular truss frames journaled at the forward corners of said body frame and foldable rearwardly over opposite sides of the same, steerable front wheels journaled at the ends of said foldable side frames, a substantially triangular truss hinged to the lower, forward corners of the body frame, spreader rods connected with the outward ends of said side frames, quick releasable coupling means on said truss for securing the inner ends of said spreader rods, a motor mounted in said body frame and controllable drive connections from said motors to said rear wheel.

9. A folding motor vehicle for carrying on aircraft comprising a body frame of narrow, upright, generally rectangular structure, a drive wheel journaled at the rear of said body frame, substantially triangular truss frames journaled at the forward corners of said body frame and foldable rearwardly over opposite sides of the same, steerable front wheels journaled at the ends of said foldable side frames, a substantially triangular truss hinged to the lower, forward corners of the body frame, spreader rods connected with the outward ends of said side frames, quick releasable coupling means on said truss for securing the inner ends of said spreader rods, a motor mounted in said body frame, controllable drive connections from said motor to said rear wheel and readily disconnectable steering connections from said body frame to said steerable wheels.

10. A folding motor vehicle for carrying on aircraft comprising a body frame, a drive wheel journaled at the rear of said body frame, a motor mounted in said body frame and arranged for operating said drive wheel, road wheel carrying trusses hingedly connected with the forward portion of said body frame and foldable rearwardly toward the sides of said body frame, an upwardly folding truss hingedly connected with the forward portion of said body frame and spreader bars disconnectably secured between said truss and side frames.

11. A folding motor vehicle for carrying on aircraft comprising a body frame, front wheel carrying side frames hinged to the forward portion of said body frame and arranged to fold backward toward the sides of the body frame, spreader rods connected with said side frames, a brace for connecting said spreader rods, said brace being pivoted to the lower, forward portion of said body frame and arranged to swing downward into a forwardly projecting position between said spreader rods, a connection for supporting said brace in forwardly projecting position and quick releasable means on said brace for detachably securing the inner ends of said spreader rods thereto.

12. A folding motor vehicle for carrying on aircraft comprising a body frame, front wheel carrying side frames hinged to the forward portion of said body frame and arranged to fold backward toward the sides of the body frame, spreader rods connected with said side frames, a brace for connecting said spreader rods, said brace being pivoted to the lower, forward portion of said body frame and arranged to swing downward into a forwardly projecting position between said spreader rods, a connection for supporting said brace in forwardly projecting position and quick releasable means on said brace for detachably securing the inner ends of said spreader rods thereto and including securing studs, the inner ends of said rods being engageable over said studs, and a spring pressed turn clamp engageable over the ends of said spreader rods and rotatable from a position clear of the same to a position holding them engaged on said studs, said turn clamp having sockets engageable over the ends of said studs in said securing position.

13. A folding motor vehicle for carrying on aircraft comprising a body frame, front wheel carrying side frames hingedly connected with the forward portion of said body frame and foldable rearwardly against the sides of the same, a front brace hinged to the forward portion of said body frame in position to be lowered in a forwardly projecting relation between the wheel carrying side frames, means for supporting said front brace in said forwardly projecting relation, a spreader connection for securing said front wheel carrying side frames in spaced relation at the front of the body frame and quick releasable means for connecting said spreader connection with said forwardly projecting brace.

14. A folding motor vehicle for carrying on aircraft comprising a body frame, wheel carrying side frames hingedly connected with said body frame and arranged to extend forwardly of the same, releasable means for securing said wheel carrying frames in said forwardly projecting relation and means carried by said wheel carrying frames for forming a baggage carrier compartment between said side frames in said forwardly projecting relation.

15. A folding motor vehicle for carrying on aircraft comprising a body frame, wheel carrying side frames hingedly connected with said body frame and arranged to extend forwardly of the same, releasable means for securing said wheel carrying frames in said forwardly projecting relation and means carried by said wheel carrying frames for forming a baggage carrier compartment between said side frames in said forwardly projecting relation and including detachably connected rod members and compartment forming panels foldably connected with said rod members.

16. A folding motor vehicle for carrying on aircraft comprising a body frame, side frames foldably connected with said body frame, steering wheels carried by said side frames, links for operating said steering wheels and comprising tubular sections joined in end-to-end relation, said sections having mating jaw elements and sliding plungers operable in said sections to hold the sections aligned in interlocked engagement and sockets on the side frames positioned to receive the ends of said sliding plungers to support the disconnected sections in the folded relation of the parts.

17. A folding motor vehicle for carrying on aircraft comprising a body frame, a drive wheel journaled at the rear of said body frame, side frames hingedly connected with the forward portion of said body frame and foldable rearwardly against the sides of the same, steering wheels carried by said side frames, a spreader connection for securing the side frames in forwardly projecting relation, a brace extending forwardly from the front of the body frame to said spreader connection, panels carried by said side frames, spreader connection and brace for forming a baggage compartment at the front of the body frame, a steering column on the body frame and steering connections extending from the lower end of said steering column beneath said baggage compartment to said steering wheels, said steering connections having disconnectable joints permitting the rearward folding of said side frames.

18. A folding motor vehicle comprising a body structure, side frames hinged to one end of said body structure and carrying steerable road wheels, a drive wheel at the opposite end of the body structure, a motor in the body structure, controllable transmission drive from said motor to said drive wheel, spreader rods connected with the outward ends of said side frames, a folding center truss pivoted to the body structure and arranged to swing into position for connecting the inner ends of the spreader rods, means at the junction of said center truss with the ends of said spreader rods for releasably connecting said parts, a steering column and foldable connections from said steering column to said steerble wheels.

19. A folding motor vehicle comprising a body frame, wheel carrying side frames hingedly connected with said body frame and arranged to be extended at the sides of said body frame, releasable means for securing said wheel carrying frames in extended relation and means carried by said side frames and the means for releasably securing them extended and forming a baggage carrying compartment between the extended wheel carrying side frames.

RAY RICHARD JENNER.
DONALD H. MITCHELL.

REFERENCES CITED

The following references are of record in the file of this patent:

UNITED STATES PATENTS

| Number | Name | Date |
| --- | --- | --- |
| 731,588 | Meinhard | June 23, 1903 |
| 937,212 | Holsman | Oct. 19, 1909 |
| 1,030,357 | Wagenhals | June 25, 1912 |
| 1,312,648 | Taussig | Aug. 12, 1919 |
| 1,717,420 | Toncray | June 18, 1929 |
| 2,050,776 | Anderson | Aug. 11, 1936 |
| 2,073,315 | McManus | Mar. 9, 1937 |